United States Patent
Forsythe

(10) Patent No.: US 10,201,820 B2
(45) Date of Patent: Feb. 12, 2019

(54) SYSTEM FOR COATING GRANULAR MATERIALS

(71) Applicant: NOUS, LLC, Florence, AL (US)

(72) Inventor: Phillip Forsythe, Florence, AL (US)

(73) Assignee: NOUS, LLC, Florence, AL (US)

( * ) Notice: Subject to any disclaimer, the term of this patent is extended or adjusted under 35 U.S.C. 154(b) by 44 days.

(21) Appl. No.: 14/538,670

(22) Filed: Nov. 11, 2014

(65) Prior Publication Data

US 2015/0132484 A1    May 14, 2015

Related U.S. Application Data

(60) Provisional application No. 61/903,026, filed on Nov. 12, 2013.

(51) Int. Cl.
| | | |
|---|---|---|
| *B05B 9/00* | (2006.01) | |
| *B05B 13/02* | (2006.01) | |
| *B01J 2/00* | (2006.01) | |
| *B01J 2/12* | (2006.01) | |

(52) U.S. Cl.
CPC ............. *B05B 9/002* (2013.01); *B01J 2/006* (2013.01); *B01J 2/12* (2013.01); *B05B 13/0257* (2013.01)

(58) Field of Classification Search
None
See application file for complete search history.

(56) References Cited

U.S. PATENT DOCUMENTS

| | | | | |
|---|---|---|---|---|
| 1,992,549 A | * | 2/1935 | Short | B22F 1/025 118/418 |
| 3,050,868 A | * | 8/1962 | Erisman | F27D 15/028 34/136 |
| 3,285,223 A | | 11/1966 | Sahlin | |
| 3,287,408 A | * | 11/1966 | Veltman | C05C 9/005 34/395 |
| 3,594,918 A | * | 7/1971 | Quester | A24B 3/04 34/131 |
| 3,707,136 A | * | 12/1972 | Kostas | C23C 16/00 118/303 |
| 3,780,447 A | | 12/1973 | Fales | |
| 3,969,546 A | | 7/1976 | Saeman | |

(Continued)

FOREIGN PATENT DOCUMENTS

WO    WO 2012/109432    8/2012

OTHER PUBLICATIONS

International Search Report and Written Opinion, PCT/US2014/065064, filed Nov. 11, 2014, report dated Feb. 23, 2015.

(Continued)

*Primary Examiner* — Charles Capozzi
(74) *Attorney, Agent, or Firm* — Brinks Gilson & Lione

(57) ABSTRACT

A system for heating, coating, cooling and screening a granular substrate is provided. The system, such as an apparatus for continuous coating granular particles, includes a preheater apparatus for heating granular particles, a rotary drum having an inlet horizontally coupled to the preheater for receiving heated granular particles directly from the fluidized bed preheater, a coating apparatus positioned within the drum for applying a coating to the heated granular particles, and a cooling apparatus positioned horizontally in association with the drum for cooling the granular particles subsequent to coating.

20 Claims, 10 Drawing Sheets

(56) References Cited

U.S. PATENT DOCUMENTS

| | | | |
|---|---|---|---|
| 4,064,831 A | 12/1977 | Okawara | |
| 4,213,924 A | 7/1980 | Shirley, Jr. | |
| 4,316,736 A * | 2/1982 | Van Hijfte | C05C 1/02 71/58 |
| 4,478,170 A | 10/1984 | Bridges et al. | |
| 4,749,349 A | 6/1988 | Thuring et al. | |
| 4,857,098 A * | 8/1989 | Shirley, Jr. | C05C 9/005 428/403 |
| 5,374,292 A | 12/1994 | Detrick et al. | |
| 5,547,486 A * | 8/1996 | Detrick | B01J 2/003 71/28 |
| 5,599,374 A | 2/1997 | Detrick | |
| 5,698,002 A | 12/1997 | Hudson | |
| 5,938,813 A | 8/1999 | Araya et al. | |
| 5,997,601 A * | 12/1999 | Kust | C05C 5/04 71/27 |
| 6,293,985 B1 * | 9/2001 | Phinney | B01J 2/12 71/28 |
| 8,178,161 B2 | 5/2012 | Xing et al. | |
| 2003/0089386 A1 * | 5/2003 | Muller | C23G 3/00 134/65 |
| 2004/0016276 A1 | 1/2004 | Wynnyk et al. | |
| 2005/0076687 A1 * | 4/2005 | Whittington | C05G 3/0058 71/64.07 |
| 2005/0236320 A1 * | 10/2005 | Didion | B01F 9/06 210/323.1 |
| 2011/0203520 A1 * | 8/2011 | Fusejima | A23G 3/0063 118/500 |

OTHER PUBLICATIONS

Extended European Search Report, dated Jul. 21, 2017, pp. 1-9, European Patent Application No. 14862840.7, European Patent Office, Munich, Germany.

European Office Action, dated Oct. 5, 2018, pp. 1-6, issued in European Patent Application No. 14 862 840.7, European Patent Office, Rijswijk, The Netherlands.

* cited by examiner

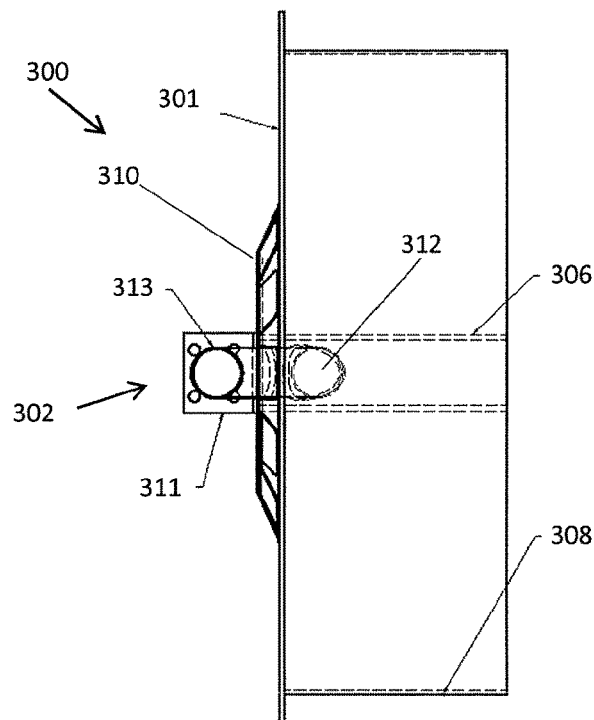
FIG 8A
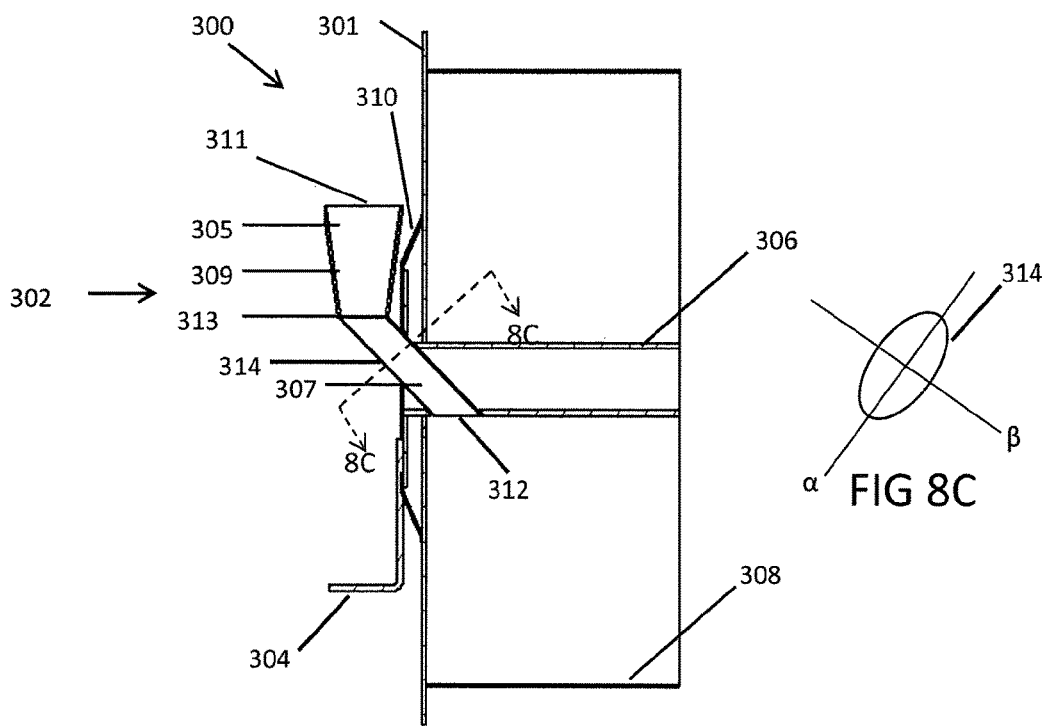
FIG 8B
FIG 8C

SYSTEM FOR COATING GRANULAR MATERIALS

RELATED APPLICATIONS

The present patent document claims the benefit of the filing date under 35 U.S.C. § 119(e) of Provisional U.S. Patent Application Ser. No. 61/903,026, filed Nov. 12, 2013, which is hereby incorporated by reference.

TECHNICAL FIELD

This disclosure relates to coating methods and systems. More particularly, this disclosure relates to methods and systems for heating, coating, cooling and screening granular materials. For the purposes of this disclosure the term "coating" can apply to any process in which a material is applied to the outside of a granular substrate. Examples of these processes can include the application of a thermoplastic or thermoset coating, any hot melt sealants such as waxes or heavy oils, or any granulation including hot melt, solution, or agglomeration. This disclosure can also be applied to any combinations of the aforementioned processes.

The methods and systems disclosed herein can be useful for granulating drums and for coating processes having a variety of coating compositions. The methods and systems disclosed herein can be applied to, and have economic advantages in, any industry that coats a granular solid. The methods and systems can apply to the coating of granular fertilizers, such as those that are reactive layer coated, with the most preferred example having a hydrophobic overcoat. One example could consist of a polymer coated granular fertilizer whose final coat consists of a hydrophobic material such as those having wax make up a portion of this final coat.

BACKGROUND

Systems for producing and/or coating granular fertilizers can involve multiple unit operations, including fluidized bed heating and cooling, rotary drums, size screeners and various forms of materials transport. Mechanisms such as bucket elevators may be utilized to transfer heated substrates from a fluidized bed heater into a separate rotary coating vessel. Following coating, products may then be transferred into a separate fluidized bed cooler to further set the coating agents and prepare the product for further handling and storage. After being cooled, the coated vessels may be transferred to a final scalping screener. As such, the granular material is required to be transferred multiple times through the coating process which may lead to process inefficiency and losses in quality. The separate operations can also increase the number of open transfer points in the system. In addition, additional expenses may be required to properly provide adequate floor space and height in order to accommodate the system.

Therefore, a need exists for an efficient and effective system to produce and coat granular fertilizers.

BRIEF SUMMARY

In accordance with the present disclosure, a system, such as an apparatus for coating granular particles, includes a preheater apparatus for heating granular particles, a rotary drum having an inlet horizontally coupled to the preheater for receiving heated granular particles directly from the fluidized bed preheater, a coating apparatus positioned within the drum for applying a coating to the heated granular particles, and a cooling apparatus positioned horizontally in association with the drum for cooling the granular particles subsequent to coating. In some embodiments, the preheater apparatus may include a static fluidized bed heater. In other embodiments, the preheater may be a mechanically assisted fluidized bed. The mechanically assisted fluidized bed may include a perforated shell or a hollow flight design which allows heated air to be injected into the rolling bed of granular material. The coating drum facilitates the coating of the heated granular material with the desired coating. The apparatus may further include a screening apparatus coupled horizontally to an outlet of the drum. A rotary screener may be utilized when an integral fluid bed cooler is used. The screener may be directly attached to the cooler and material then discharges over a dam into the rotary screener.

In another aspect, a system, such as an apparatus, for coating granular particles includes a rotary drum, a coating apparatus positioned within the rotary drum for applying a coating to heated granular particles, and a cooling apparatus horizontally close coupled in association with the rotary drum for cooling the granular particles subsequent to coating, the cooling apparatus comprising an air inlet for a flow of cooling air to cool coated granules and a source of water including a spray outlet directed toward the bed of coated granular particles, the water being applied to the bed at a rate which ensures the evaporation residence time of the water on the coated particle surface is less than the diffusion time into the coating. In some embodiments, the air inlet may be sized to allow the introduction of air at a rate of less than about 0.0312 cubic meters per minute per kg of coated particles (1000 cubic feet per minute per ton of coated particles). In other embodiments, the spray outlet may be sized to spray only between about 0.001 and 0.050 kg of water per kg of coated particles (0.001 and 0.050 lb per lb of coated particles).

In yet another aspect, a method of cooling granular particles subsequent to being coated with a polymer coating includes coating granular particles at a first temperature with a coating apparatus, the coating apparatus being positioned within a rotary drum, transferring the coated granular particles to a cooling device horizontally coupled to the rotary drum, the cooling device including an air inlet for a flow of cooling air to cool coated granules, and cooling the coated particles until the coated particles achieve a second temperature lower than the first. In some embodiments, the cooling device may further include a source of liquid including a spray outlet directed toward the bed of coated granular particles. In some embodiments, the method further includes spraying the coated particles, while in motion in the fluidized bed, with liquid at a rate which ensures the evaporation residence time of the water on the coated particle surface is less than the diffusion time into the coating, until the coated particles achieve a second temperature lower than the first temperature. In some embodiments, the spray outlet is positioned under the rolling bed of coated granular material.

BRIEF DESCRIPTION OF THE DRAWINGS

FIG. 8A is a top view of an embodiment of a feed entry apparatus.

FIG. 8B is a side view of the embodiment of a feed entry apparatus of FIG. 8A.

FIG. 8C is a cross-sectional view of a chute in the embodiment of a feed entry apparatus of FIG. 8A.

DETAILED DESCRIPTION OF THE DRAWINGS AND THE PRESENTLY PREFERRED EMBODIMENTS

Figure 1:
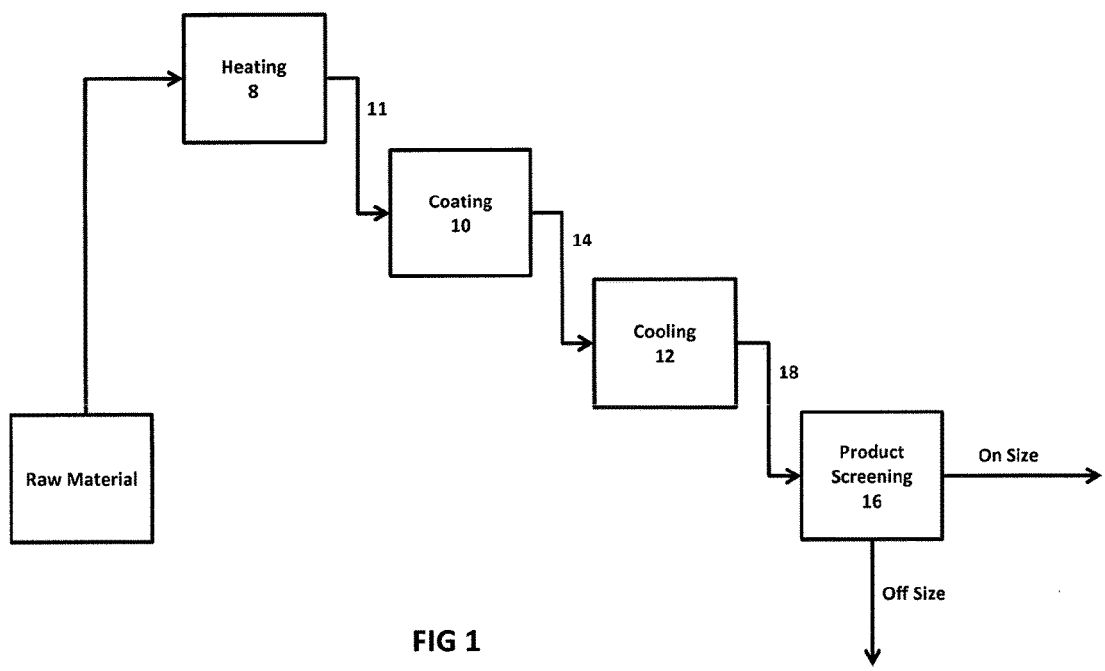
FIG. 1 is a block flow diagram for gravity-driven coating equipment.

For the purposes of promoting an understanding of the principles of the present disclosure, reference will be made to the embodiments illustrated in the drawings, and specific language will be used to describe the same. Moreover, in the figures, like-referenced numerals designate corresponding parts throughout the different views.

Systems for producing and/or coating granular fertilizers may provide a metered substrate that is introduced into a fluidized bed. The substrate can be heated and discharged and transferred to a bucket elevator. The bucket elevator can lift the substrate to a sufficient height to allow for discharge and transfer via gravity into the elevated rotary coating vessel. In order to allow for the transfer to take place, the rotary vessel can have an inlet breach large enough to accommodate the angled chute for the entering substrate. Once positioned within the rotary vessel, the material can be subjected to the rotary action and the coating agents can be added. The product can then be transferred, via conveyor or angled chute into a large one pass fluidized bed cooler to further set the coating agents and prepare the product for further handling and storage. After being cooled, another gravity transfer can be used to move the material to a final scalping screener.

Thus, the overall process can involve multiple unit operations, including fluidized bed heating and cooling, rotary drums, size screeners and various forms of materials transport. Granular solids, unlike liquids, are characterized by a property called "angle of repose" which can be defined as "the steepest angle of descent or dip of the slope relative to the horizontal plane when material on the slope face is on the verge of sliding." Due to this property, transfers between vessels can utilize expensive bulk materials handling equipment such as bucket elevators or vertical height so that granules may fall from vessel to vessel. In addition, when employing gravity chutes, it may be necessary to provide the gravity chute with enough vertical height such that the chute does not descend at an angle shallower than, or even approaching, that of the angle of repose. As such, the property may be limiting when a gravity chute has to enter a breach in a moving piece of equipment such as the inlet of a rotary drum.

The maximum throughput of a rotary drum processor is a function of the diameter of the drum, the slope of the drum shell to the horizontal, the rotational speed, and the height and location of dams or restrictions. Because a traditional process may require an angled chute to breach the inlet of the drum the feed end dam is severely limited in height. As such, attempting to employ deeper bed to increase retention time so that higher throughputs can be realized may cause material to spill over the feed end dam, and can render a large percentage of the drum volume unusable.

The separate unit operations and largely vertical orientation of traditional granule coating facilities can increase the floor space and height requirement of any existing building or new construction proposed to house the facility. The nature of the equipment also may not allow for any preassembly and each piece may be shipped separately. The typical arrangement may also require equipment to be elevated. Each elevated piece of equipment can require support and access structures, which may require a significant engineering effort during the design phase, along with the time and expense spent rigging, assembling, and fitting each piece of equipment and support structure during construction and startup.

The typical arrangement can also lead to process inefficiency and losses in quality. When material spends time on an open conveyor or contacts the large thermal mass of a bucket elevator, a large quantity of heat can be lost by the substrate, which may require significant overheating before processing to combat these losses. This overheating can bring about physical or chemical changes in the substrate material. Furthermore, each handling step, especially those that require a gravity drop, can be destructive to both raw materials and finished products. Destructive handling to substrates can lead to the formation of dusts and small highly angular particles. These particles can be very difficult to coat evenly due to the irregular surface. The increase of dusts and small particles can lead to an increase in overall substrate surface area in the processing vessel, which can lead to an increase in coating agents required to reach the desired thickness or placing many hygroscopic imperfections through an intended hydrophobic shell. Each open transfer point also can be equipped with a dust pickup point. The more transfer points in a facility, the larger, more powerful and more expensive the dust control equipment can become.

Thus, it is desirable that the apparatus occupy as small a space as possible to permit utilization of the apparatus and processes in smaller, and hence less expensive, buildings. With any reduction in size, possible skid mounted, portable and even mobile production facilities can be contemplated.

The present disclosure is a continuous system for a horizontal granular material coating apparatus. The system may include a fluid bed preheater, coating drum, fluid bed cooler and sizing screen which are integrated into a modular apparatus. Any combination of these unit operations can be utilized. The embodiments of the disclosed system may combine or close couple several unit operations, providing for a compact system that minimizes required floor space, building height, energy, transfer points and materials handling. The example embodiments of the disclosed system provide for gains in efficiency, quality, and throughput per unit vessel volume. The example embodiments of the disclosed system lend themselves to modularization, allowing preassembly, ease of shipping, along with relatively quick and inexpensive set ups and start ups. This modularization of such a system could create a mobile and/or skid mounted unit that could easily be transported to in-market locations to minimize shipping costs for raw materials and/or products.

In accordance with the present disclosure, one can combine and modularize, for example, any number of the following six unit operations: metering and feeding of granular solids, preheating of the granular solids, metering and feeding of coating agents, coating of granular solids, cooling of coated product, and final product screening. The horizontally integrated apparatus can accommodate granulation, thermoplastic and thermoset coating processes or any other process which requires conditioning of a granular material.

In an example embodiment, a horizontal integration of apparatus can be formed to handle granular particulates. For example, a fluidized bed preheater can be directly attached to the front of a rotary drum in which the heated granular particulates can be further treated and/or coated. A mechanically assisted fluidized bed cooler can be situated within the rotary drum to cool the granular particulates subsequent to the treatment and/or coating process. Both cooled air and water can be used in the fluidized bed cooler portion of the rotary drum. A rotary screener can be coupled horizontally, or more preferred integral, to the outlet of the drum to receive the cooled granular particulates for granular sizing.

FIG. 1 schematically depicts an arrangement of apparatus that can be used for applying a two or more component coating to granular particles. The particles can be pre-heated in a heating apparatus 8, such as a fluidized bed, to a temperature sufficient to sustain a polymer reaction on the surface of the particles once they are introduced into a coating apparatus 10. In some embodiments, the heating apparatus may be heated with air from a blower, which may be directly heated by a gas fired burner. The transfer between the heating apparatus 8 and the coating apparatus 10 may be accomplished by action of gravity on the coated particles moving downward through a tube or chute 11. The transfer can also be accomplished with the aid of conveyors of various forms. The coating apparatus 10 can take a variety of forms. Once a sufficient coating has been applied to the granular particles, the coated particles are transferred to a cooling apparatus 12. The transfer between the coating apparatus 10 and the cooling apparatus 12 can be accomplished by action of gravity on the coated particles moving downward through a tube or chute 14. The transfer can also be accomplished through the use of conveyors of various forms.

The cooling apparatus 12 can take a variety of forms. An example is a horizontal fluidized bed cooler. Cooling air can be introduced beneath the fluidized bed to drop the temperature of the coated particles. The cooled coated particles can then be transferred to a size separation apparatus 16. The transfer between the cooling apparatus 12 and the separation apparatus 16 can be accomplished by action of gravity on the coated particles moving downward through a tube or chute 18. The transfer can also be accomplished with the aid of conveyors of various forms. The separation apparatus 16 can also take a variety of forms. In general, the separation apparatus 16 includes one or more screens to separate large agglomerated particles on the one hand, and fines on the other hand, from a desired stream of coated particle size.

Figure 2:
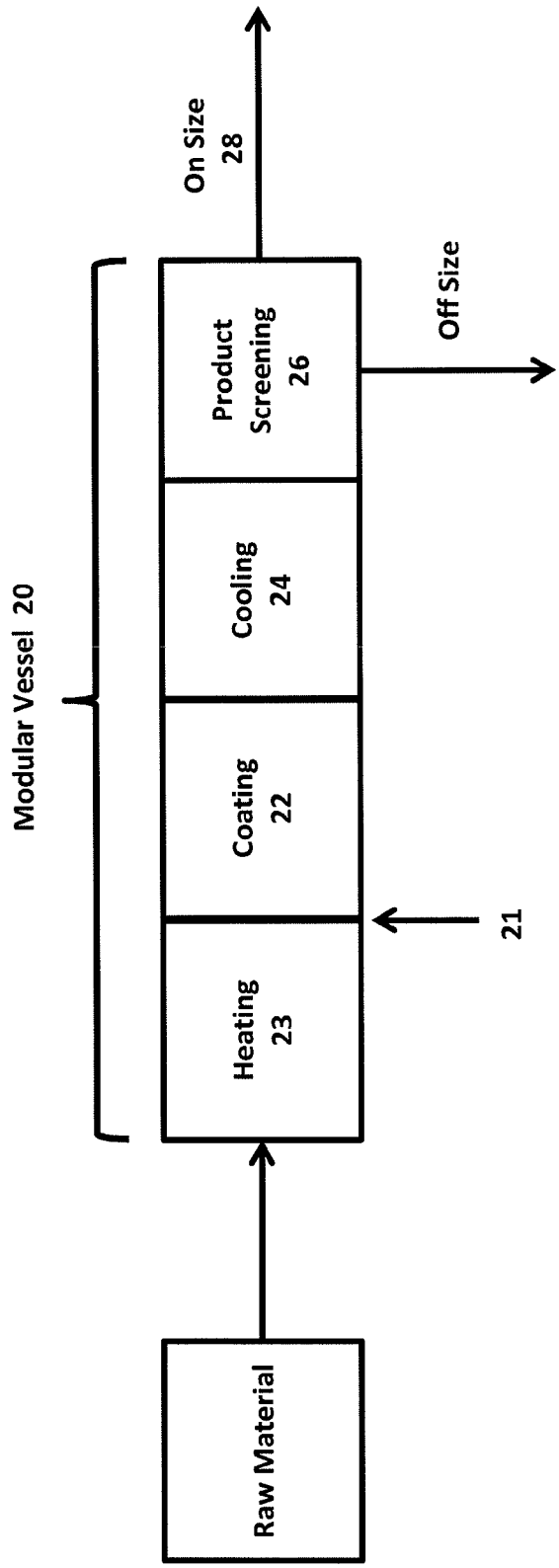
FIG. 2 is a block flow diagram of the general horizontal arrangement of an example embodiment of a modular linear heater/coater/cooler/sizing equipment setup.

FIG. 2 schematically depicts an example embodiment of a modular vessel 20 to be used in connection with the continuous processes disclosed herein. An embodiment of the modular vessel horizontally couples a rotary heater 23, rotary coating vessel 22 and a rotary cooler 24 with a product screening apparatus 26, such as a rotary screener. In some embodiments, the modular vessel may horizontally couple a static heater 23, a static coating vessel 22, and a static cooler 24 with a product screening apparatus 26. The vessel 20 can include twisted and/or helical flights, lifting flights or backward inclined flights fixed to the interior surface of the vessel 20 to ensure a timely advancement of the particles from an intake 21 through the various stages of the process to a product output 28. At the intersections of the various stages 22, 24, and 26 the flights can be shaped to effectively dip out and lift the coated granules from the bed on one stage into the next stage to minimize the generation of dust and fines. In some embodiments, the granules can also be transferred from stage to stage by discharging the granules over a dam. In other embodiments, where a dam is not present, the granules may traverse longitudinally down the length of the drum.

Figure 3:
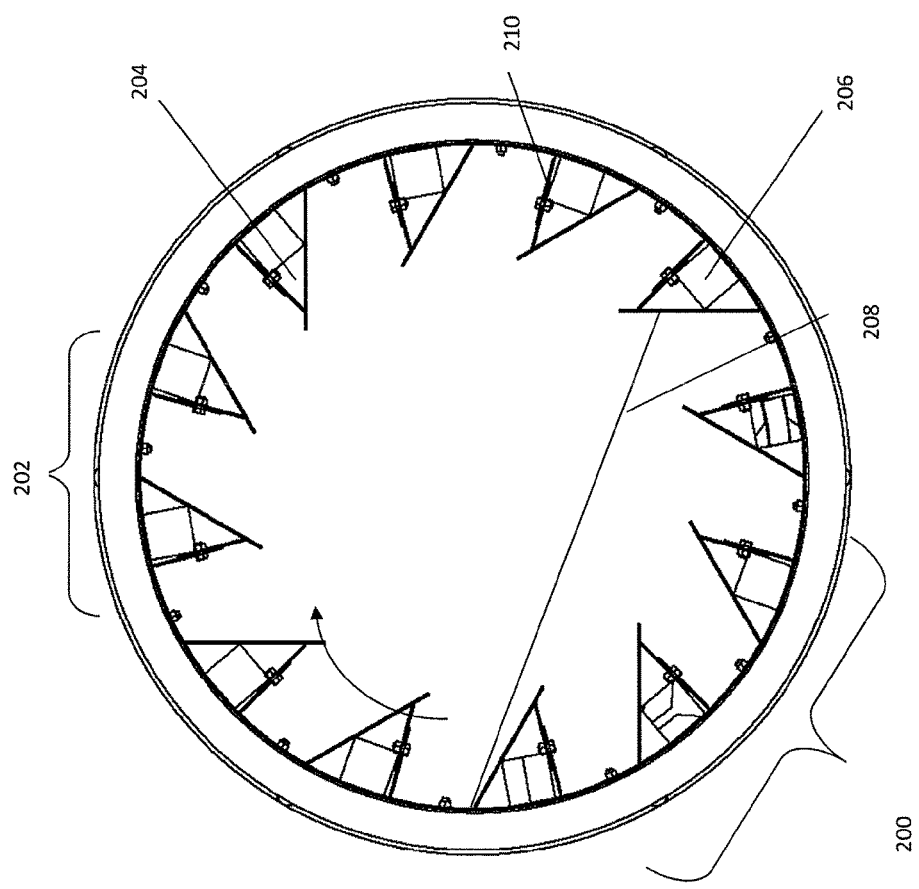
FIG. 3 is a cross sectional view of an example embodiment of rotary component having hollow flights for distribution of granules in a fluidized bed.

FIG. 3 illustrates a cross section of an example embodiment of a hollow flight type rotary heater or cooler. The heater can be integral to the coating vessel. In this embodiment, a granule bed 208 is mechanically agitated by the combination of the rotary action and a backward inclined hollow flight 204. Fluidizing air or gas for thermal conditioning is introduced through holes 206 formed in a seal plate at a longitudinal end of each flight. The fluidized air can be discharged from openings in the hollow flights 204 where the longitudinal running face of each flight meets the rotary vessel's interior shell 210. The seals are constructed such that air is only introduced in the axial position 200 that is under the bed of granules 208. Air may be removed from the vessel for environmental treatment at axial position 202 through the same openings in the flights 204.

Figure 4:
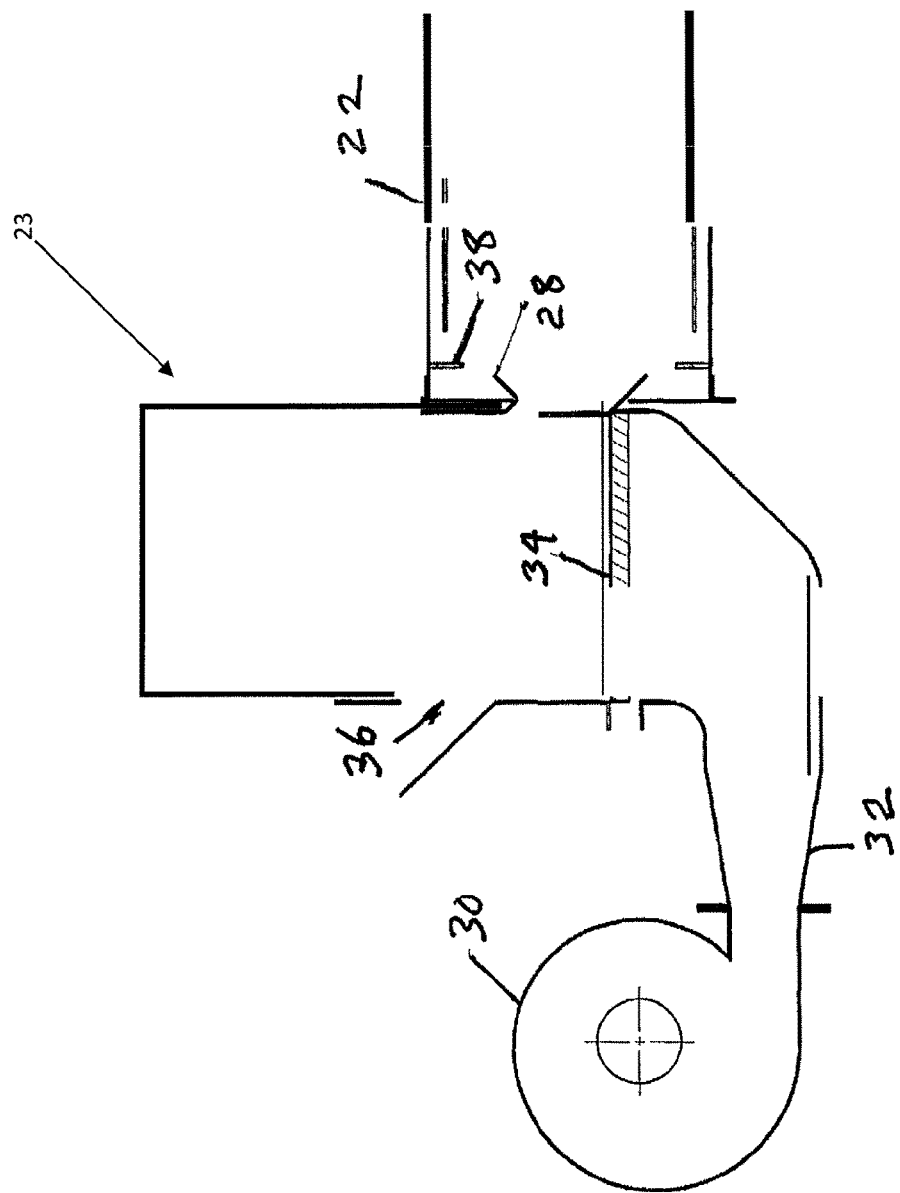
FIG. 4 is a sectional view of an example of a fluidized bed preheater horizontally close coupled to a drum coating vessel.

FIG. 4 shows an example embodiment of a fluidized bed preheater 23 that is horizontally close coupled to a drum coating vessel 22. The fluidized bed preheater 23 preheats granular material in preparation for operations to take place in the horizontally coupled drum 22. The fluidized bed preheater 23 can be supplied by a source of heated air or gas 30 coupled to a lower intake 32 located below the bed 34. Granules are introduced into the fluidized bed preheater 23 through intake 36. In this example, an inverted feed cone 28 provides a transfer point for material from the preheater 23 to the drum 22. In addition, in other examples, other types of fluidized bed preheaters, or other types of preheaters providing a compatible transfer point may be used to preheat the granules. A dam 38 is provided in close proximity to the transfer point for material from the preheater 23 to the drum 22 to prevent granules from spilling and allows deeper more uniform beds to develop.

Figure 5:
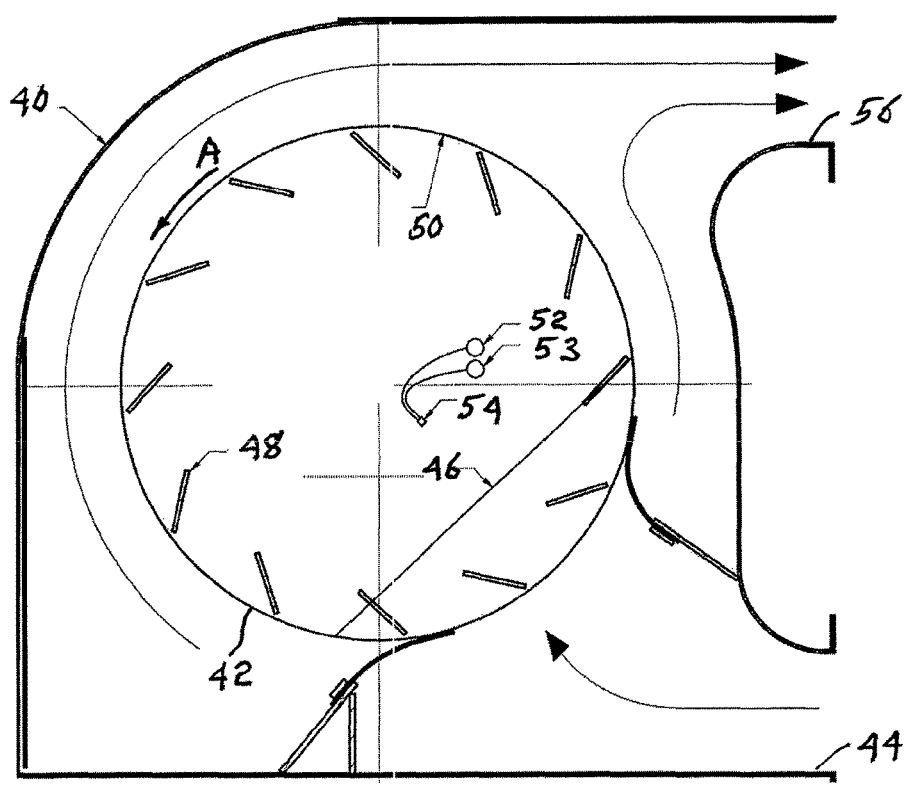
FIG. 5 is a schematic cross-section of an example of a perforated drum heater or cooler with a cooling nozzle arrangement directed onto the bed, and an upward flow of air passing through the drum wall into the bed.

FIG. 5 depicts an example embodiment of a cross-sectional view of a heating or cooling vessel 40, which can be a stand-alone apparatus or integrated into the modular vessel 20. The vessel 40 comprises a drum 42 that is preferably perforated so as to allow for an inflow of conditioned air from an intake plenum 44 into the drum 42, and through a bed 46 of granular material. The drum 42 can include flights 48 fixed to the interior surface 50 of the drum 42, which interact with the bed 46 of granular material, and the drum is rotated in the direction of arrow A. If utilized as a cooler, a source of cooling liquid 52, such as water, can be mounted within the drum 42 having one or more outlet nozzles 54 directed toward the bed 46 of coated granules so that the liquid spray impinges directly on the granules. A source of a gas, such as air 53 can also be mounted within the drum 32, and connected to outlet nozzles 54. The flow of liquid and gas through the outlet nozzles 54 can atomize the liquid as the liquid and air exit the nozzles. The flow of liquid through the nozzles can be controlled so that the evaporation residence time of any liquid on the coated particle surfaces is less than a predetermined time, such as a diffusion time into the coating, until the coated particles achieve the desired cooled temperature, and can then be transferred to a size separator. Outflow plenum 56 is provided to allow an effluent stream of air and vapors produced from the atomization of the liquid to exit the drum.

Figure 6:
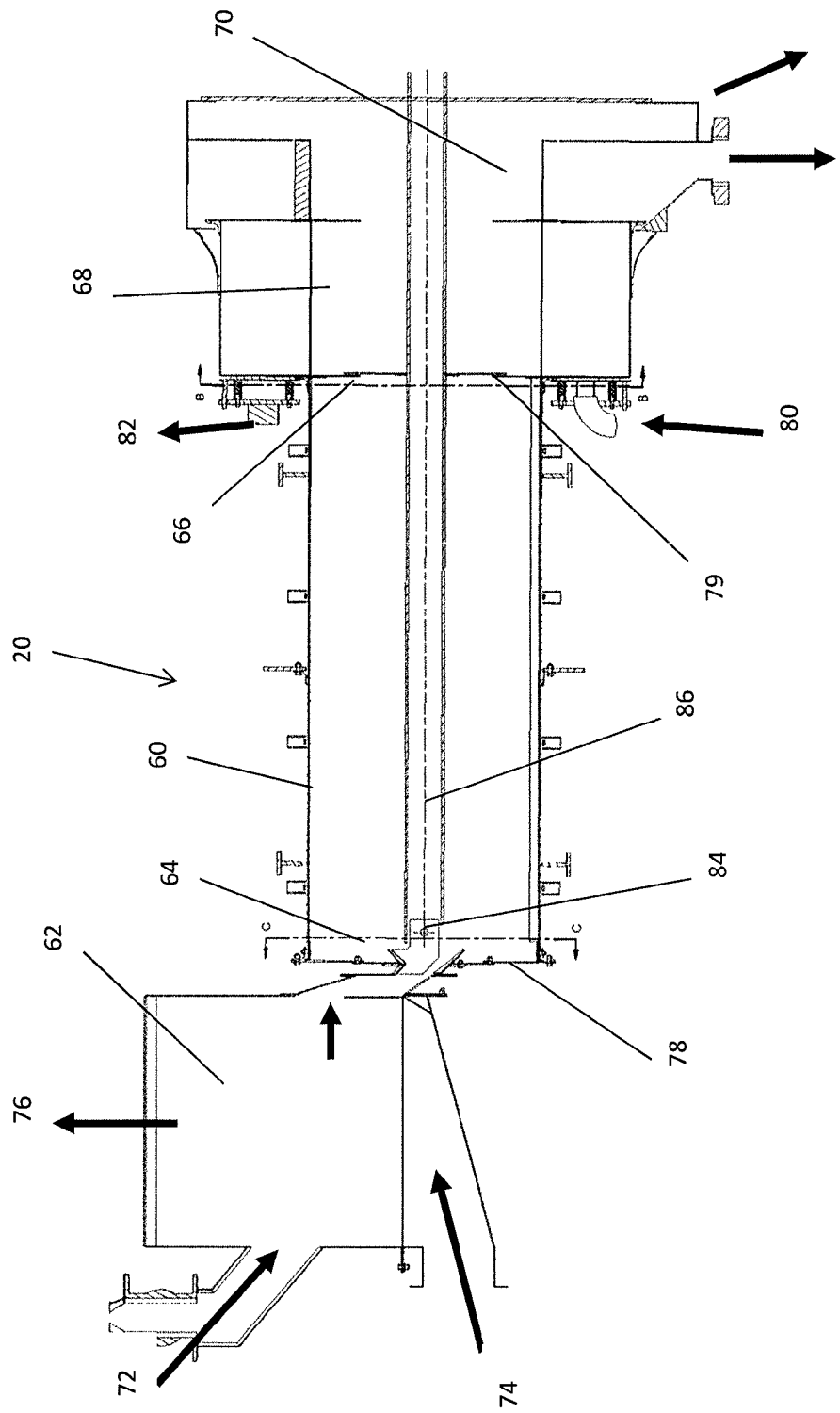
FIG. 6 is a sectional view of an example embodiment of a modular vessel having a rotary drum coupling to a static fluidized bed on the inlet end of the rotary drum, a perforated shell rotary drum cooler coupled on the discharge end of the rotary drum, and a screener coupled to rotary drum cooler.

FIG. 6 is schematic sectional view of an example embodiment of the system included in a modular vessel 20. In this embodiment, the modular vessel 20 includes a rotary drum 60 horizontally coupled to a static fluidized bed 62 on the inlet end 64 of the rotary drum 60, a perforated shell cooler 68 on the discharge end 66 of the rotary drum 60, and a rotary screener 70. In this embodiment, the rotary drum 60, the cooler 68, and the rotary screener 70 are horizontally positioned and integral. In alternative embodiments, some or all of the components may be independent components that are horizontally close coupled. The components may be close coupled by any suitable mechanical coupling method, including, but not limited to, welding and bolting. The static fluidized bed 62 has an input 72 for granulated product, a source 74 of heated air or gas, and an outlet 76. Heated granulated product is transferred directly between the static fluidized bed 62 and the rotary drum 60 through entry 64 that can be equipped with a dam 78. As shown, the entry 64 may be in the shape of an inverted cone. In other embodiments, the entry 64 may comprise a combined chute and support truss. The utilization of this closely coupled static fluidized bed 62 and the entry 64, such as the inlet, inverted cone, in a centered horizontal arrangement as the transfer point allows for the use of feed end dams with increased height thus increasing throughput and capacity. The configuration can also reduce attrition of the granules by minimizing the overall height that granules must fall during the process, thereby eliminating multiple impacts and abrasion of the granules. In one example, the modular system may utilize a heat transfer system that removes heat from the outflow airstream and condenses the water vapor from the outflow airstream. The condensed water vapor can be filtered and recirculated to the drum for cooling. The cooled outflow airstream can also be recirculated, thus affecting a closed loop coating system, thus minimizing contaminated air discharged to the environment The modular system 20 further includes a support beam structure 86 positioned within the rotary drum 60. The support beam 86 is positioned substantially near a central axis of the rotary drum 60 such that the rotatory drum 60 surrounds and is free to rotate with respect to the support beam 86. A source of cooling gas, such as air 80 is coupled to the cooler drum 68. An outlet 82 is provided for the air and vapor emitted by the cooling coated granules. The gas, such as air introduced through the bed of granular material may be captured with any accompanying vapors and/or dust particles for subsequent treatment. The cooled coated granules can then be directly transferred to the rotary screener 70, which ensures product is of the desired size. In alternative embodiments, the screener 70 may be static.

The static fluidized bed 62 may be a fluid bed wherein a horizontal perforated plate is utilized to fluidize the granular material. In some embodiments, the close coupled heater can also be utilized for preheating the coating apparatus. Some configurations can utilize recirculation of heated raw materials and use two or more additional transfer points and a recirculation device or mechanism, such as a conveyor, to preheat the coating apparatus. Heating can now be achieved by bleeding heated air into the coating apparatus. This purposeful bleeding of preheater air down the length of the coating apparatus allows decreased startup heating times and can reduce or eliminate constant recirculation of heated raw materials. It also can allow for more precise temperature control to maintain temperatures during coating and reaction processes.

In this embodiment, the support beam 86 within the rotary drum 60 is utilized to hold injection and/or spray nozzles, and can extend longitudinally for substantially the entire length of the rotary drum 60. In other examples, a shorter support beam 86 or more than one support beam 86 may be used. The support beam 86 is held in place by a pin and socket (or other) hanger 84. In an example embodiment, the pin 84 is attached to the front of the support beam and the socket is located in the feed end 64 of the rotary drum 60. In other embodiments, other coupling mechanisms are possible. This hanger serves two purposes: it supports the front of the support beam and also locates the beam inside the drum each time it is removed and replaced. The generally central location of the hanger, support bracket, and therefore the support beam 86 allows for a greater percentage fill of the drum which in turn increases the throughput capability. For example, in some instances, the fill of the drum may be increased to about 50% as compared to conventional methods, which may increase the throughput capability by at least two fold.

The central location of the support beam 86 also allows for use of a smaller more compact coating apparatus to achieve throughput comparable to larger drums used in current technology. This is achieved by using a taller discharge end dam to increase the capacity. The support beam can include injection nozzles to apply coatings to the granular material. In some embodiments, the nozzle system may be adjusted manually. In alternative embodiments, the nozzle system may be adjusted from outside of the system while it is running, such as using servos, motors or some other form of device that allows repositioning of the injection/spray nozzles both with respect to spray direction and/or position along the support beam 86. This allows an operator of the system to maintain optimization of coating distribution without stopping operations in order to modify the placement of the nozzles due to coating rate changes. The modular vessel 20 may further include a rack that slides horizontally along the length of the drum. This rack may be used to store, meter, and or deliver the liquid coating components to the injection nozzle system.

The granulated product can be coated while traversing the length of drum 60 between the entry 64 and the shell cooler 68. When determining desired coating levels, there are a number of factors to be considered. For example, there are a number of different potential resin pairs that can be employed for reactive layer coatings. The final curing rate for these resins is most greatly impacted by temperature and by the types of functional chemical groups present. Thus, for a specific resin pair, control of the temperature also controls the rate of curing. In addition, a predetermined amount of curing, or setting, time may be desired before the addition of another layer or before any handling can take place.

The maximum throughput of a rotary drum 60 is a function of the diameter of the drum, the slope of the drum shell to the horizontal, the rotational speed, and the height and location of dams or restrictions. The rotary drum 62 can be equipped with a dam 78 at the feed end 64 and a dam 79 at the discharge end 68 that prevents granules from spilling and allows deeper more uniform beds to develop. Thus, the taller the feed end dam, the greater the throughput capacity. For a given diameter, rotational speed, and shell slope, the height of the feed end and discharge end dams determine the potential maximum throughput of the drum because any given coating, granulation, or other processing will require a predetermined minimum residence time in the vessel. Residence time can be defined as the amount of time substrates fed into a unit remain in the unit. The retention time can be determined by dividing the retained mass or volume by the process throughput. If the retention time for a vessel at set of conditions is known, the length of the vessel can be divided into blocks of time. This can allow accurate spacing between applications to ensure each application has experienced the setting time that the operator desires.

Thus, in embodiments, for a given total product coating weight percentage $C_T$, a retention time can be calculated by the following formula:

$$t_R = \frac{M_R}{Q} = \left(\frac{C_T}{C_L}\right)(t_L + t_A)$$

Where $t_R$ is the minimum retention time, $M_R$ is the retention mass of the rotary vessel, Q is the mass throughput of the process, $C_T$ is the total coating weight percentage, $C_L$ is the desired coating weight percentage per layer, $t_L$ is cure time for each layer and $t_A$ is the application time for each layer. By rearranging this equation, for a given rotary coater with a specific retention mass, the maximum throughput of a given coated product is:

$$Q = \left(\frac{C_L}{C_T}\right)\left(\frac{M_R}{t_L + t_A}\right)$$

When a known retention time at a given throughput is combined with the dimensions of the rotary vessel, the average longitudinal velocity of a given slug of material in a rotary drum processor can be estimated. This average longitudinal velocity can be used to space the coating steps in the vessel to ensure a sufficient amount of curing time has passed before the granules experience a second coating application. The coating applicators can be spaced such that the desired setting time has passed before the slug of granules reaches the subsequent set of applicators at the design rate. If product grade, number of layers, production rate, resin chemistry, or any other variable that affects the average longitudinal velocity, the resin curing rate or the number of layers being applied is changed, the distance between applicators can also be changed to maintain optimization and maximum throughput.

Embodiments of the system where the nozzle system attached to the support beam 86 for positioning coating material applicators is automated has numerous benefits. Such a system allows an operator to change applicator locations during a product grade or rate change without stopping operations, saving time, material and energy. This adjustable positioning system could make certain batch processes obsolete as some of the lower volume production can now be added to the front end or back end of a higher volume product. Quick, reproducible, on the fly adjustment of application zones is also key to maintaining optimization at varying rates and to maximizing throughput at a given number of coating layers and overall coating weight percentage by eliminating wasted drum space. A system with this capability may provide for a universal coating machine capable of coating almost any substrate with almost any resin pair.

Nozzles may be supported and moved individually or in pairs. One embodiment could consist of an applicator pair support attached to the central support beam via any type of linear bearing or slide. Locomotion may be accomplished via any number of manual or automated methods. For example, an embodiment can use a ball screw. Another can use a rack and pinion. Pneumatic and/or hydraulic actuation encompasses still another embodiment. Other means of linear actuation may be applied via jackscrews, lead screws, roller screws, or rigid chains. The system may also be combined with proximity or other position sensors.

In some embodiments, the cooler drum 68 may also be in the form of a horizontally close coupled static fluidized bed or a horizontal mechanically assisted integral fluidized bed, immediately after of the coating section. The static fluidized bed may be a fluid bed wherein a relatively horizontal perforated plate is utilized to fluidize the granular material. This type of fluid bed cooler can be fed by a centrally located transfer point, such as an inverted feed cone, which is attached to the rotary coating drum 60. In other embodiments, the static fluidized bed may be integrated into a discharge hood, where the coated particles may discharge over a dam, through a screening device, such as a grizzly, and onto the horizontal perforated plate. In embodiments where the cooler drum 68 is a horizontally mechanically assisted integral bed, a perforated shell or a hollow flight design, integral to the drum 60, may be used to inject cooled air into the rolling bed of granular material. The integral fluidized bed can also consist of a lifting device, which uses twisted flights fixed to the interior of the rotary vessel. These twisted flights can be shaped in a helical fashion, effectively dipping out and lifting granules gently from the bed and into the next step of the process.

In an example embodiment, the cooler drum 68 may provide a finely atomized liquid spray, such as water, onto the material bed, as well as an injection of a gas, such as air through the bed. In this embodiment, the spray is purposely oriented to impinge directly on the coated granules at a rate which ensures the evaporation residence time of the thin film of water on the granule surface is less than the diffusion time into the coating or material surface for uncoated material. This cooling method can be used to eliminate or used to supplement currently employed cooling methods. A further advantage is that direct contact of the cooling mist with the granules and surrounding air will begin the reaction of isocyanate vapors with water leading to lower isocyanate concentrations in the effluent stream. This can reduce the wet scrubber size required for exhaust vapor treatment. Furthermore, this can lower the overall volume of air to the emissions control device. The present embodiment may be applicable to a granular feed with diameters in the range of about 0.000762 m to 0.0762 m (0.03 in. to 3 in.), but more favorably between about 0.001524 m to 0.0254 m (0.06 in. to 1 in.), and most favorably between about 0.00178 m to 0.00381 m (0.07 in. to 0.15 in.). The cooling water application rates may range from about 0.001-0.005 kg of water per kg of granular material (0.001-0.05 lb of water per lb of granular material), and even more favorably between about 0.002-0.007 kg of water per kg of granular material (0.002-0.007 lb of water per lb of granular material), and most favorably between about 0.003-0.005 kg of water per kg of granular material (0.003-0.005 lb of water per lb of granular material).

In one embodiment, an atomized mist of water is sprayed onto the bed in the cooling section of a rotary polymer coating drum and material is immediately screened and stored. In another embodiment, an atomized mist of water is sprayed onto the bed in the cooling section of a rotary polymer coating drum and material is ejected into a relatively small fluid bed before being screened and stored. In an alternative embodiment, granules may be cooled in a fluidized bed where water is injected directly into the bed, thus greatly reducing the size of fluidized bed required.

Figure 7:
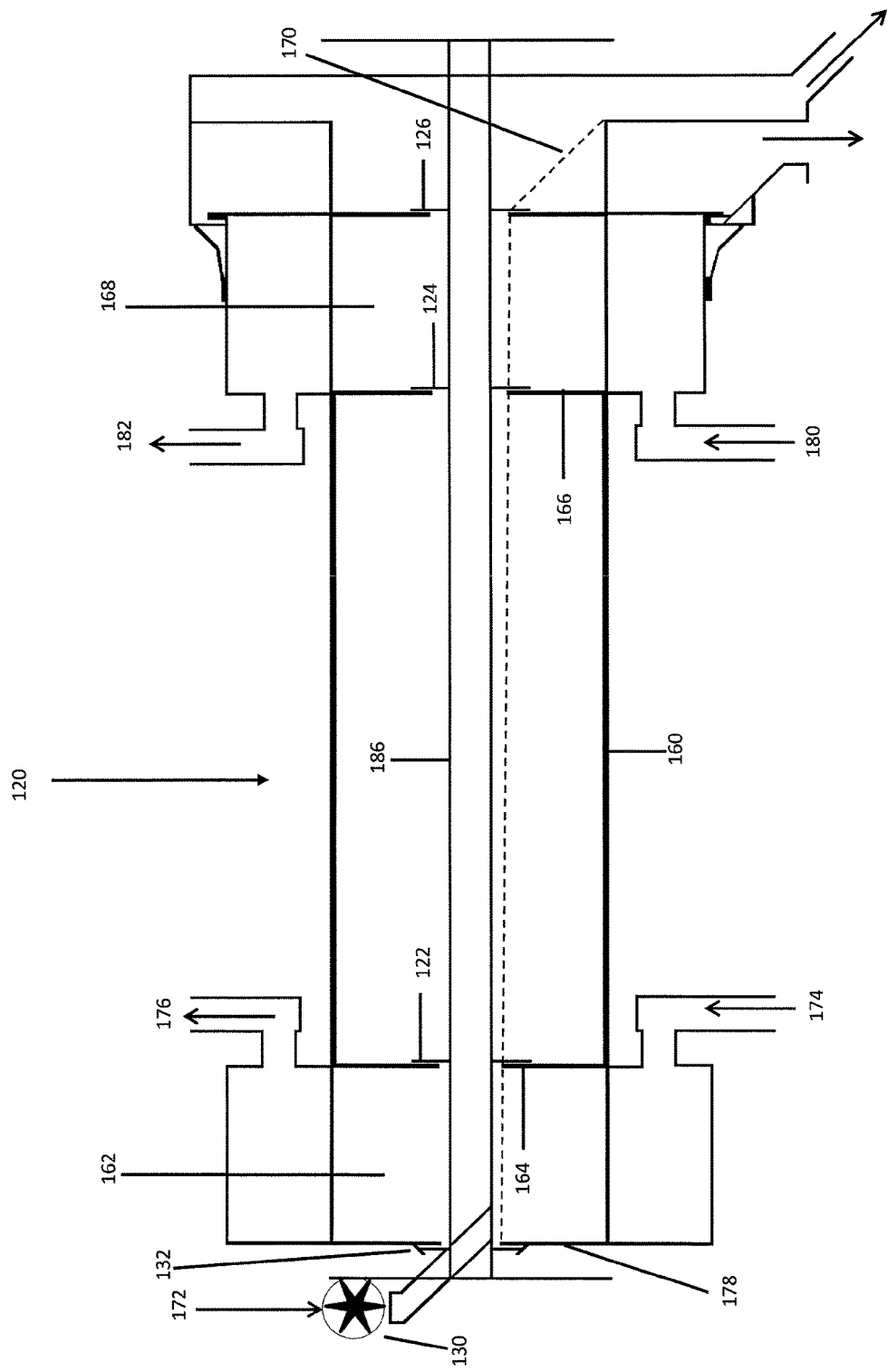
FIG. 7 is a sectional view of an example of an alternative embodiment of a modular vessel having a rotary drum coupled to a rotary fluidized bed on the inlet end of the rotary drum, a perforated shell rotary drum cooler coupled on the discharge end of the rotary drum, and a rotary screener coupled to rotary drum cooler.

FIG. 7 is schematic sectional view of an example alternative embodiment of a modular vessel 120. The modular vessel 120 includes a rotary drum 160 horizontally coupled to a perforated shell rotary drum heater 162 having a dam 178 on the inlet end 164 of the rotary drum 160, a perforated shell cooler 168 on the discharge end 166 of the rotary drum 160, and a rotary screener 70. In this embodiment, the perforated shell rotary drum heater 162, the rotary drum 160, the cooler 168, and the rotary screener 170 are horizontally positioned and integral. In alternative embodiments, some or all of the components may be horizontally close coupled. The components may be close coupled by any suitable mechanical coupling method, including, but not limited to, welding and bolting. The rotary heater 162 has in input 172 for granulated product equipped with an air lock device 130, a source 174 of heated air or gas, and an outlet 176. Heated granulated product is transferred directly between the rotary heater 162 and the rotary drum 160 through entry 164 which is a dam separating the two, which forms a transfer point. The air space between rotary heater 162 and rotary drum 160 is separated by an air dam 122. The shell rotary drum heater 162 may include a perforated shell or a hollow flight design, integral to the drum, to inject heated air into the rolling bed of granular material. The modular system 120 includes a support beam structure 186. The support beam 186 is positioned near a central axis of the rotary drum 60. On the inlet end 164, the support beam 186 is equipped with a seal 132.

As shown in this embodiment, the support beam 186 within the rotary drum 160 is utilized to hold injection and/or spray nozzles that longitudinally extend a part of, or the entire length of the rotary drum 160. The central location of the support beam 186 allows for a greater percentage fill of the drum, which in turn increases the throughput capability of the modular vessel 120. The location of the support beam 186 also allows for the use of a smaller more compact coating apparatus to achieve throughput comparable to larger drums used in current technology. This is achieved by using a taller discharge end dam to increase the capacity. The support beam 186 can include injection nozzles to apply coatings to the granular material. In some embodiments, the nozzle system may be adjusted manually. In alternative embodiments, the nozzle system may be adjusted from outside of the system while it is running using automation. This automatic adjustment is advantageous because it allows an operator to maintain optimization of the system without the need to stop or suspend the process for nozzle placement changes due to coating rate changes. The modular vessel 120 may include a rack that slides horizontally along the length of the drum. The rack may be used to store, meter, and or deliver the liquid coating components to the injection nozzle system, similar to previously discussed embodiments.

The granulated product can be coated while traversing the length of drum 160. When determining desired coating levels, there are a number of factors to be considered. There are a large number of potential resin pairs that can be employed for reactive layer coatings. The final curing rate for these resins is most greatly impacted by temperature and by the types of functional chemical groups present. Thus, for a specific resin pair, the control of the temperature also controls the rate of curing. In addition, a certain amount of curing, or setting, time may be desired before the addition of another layer or before any handling can take place.

After the coating has distributed and/or reacted, the coated product can be directly transferred to the cooler drum 168. The air space between rotary drum 160 and rotary cooler 168 is separated by an air dam 124. A source of cooling air 180 is coupled to the cooler drum 168. An outlet 182 is provided for the air and vapor emitted by the cooling coated granules. The cooled coated granules can then be directly transferred to the rotary screener 170, which ensures product is of the desired size. The air space between rotary cooler 68 and rotary screener 70 is separated by an air dam 126. In some embodiments, air dams 122, 124, and 126 are directly attached to the support beam structure 86 and do not rotate with the rotary drum 60. While this embodiment includes three air dams, it is understood that alternative embodiments may include more or less air dams, including no air dams.

FIGS. 8A-8C provides an example embodiment of a feed entry apparatus 300 including a combined material feed chute 302 and support truss 306. FIGS. 8A and 8B show a top view and a side view, respectively, of the feed entry apparatus 300. As shown, the chute 302 is coupled to a rotary drum 308. A feed end ring 301 is positioned about the feed chute 302. A bracket 304 may be provided to anchor the chute 302 and the truss 306 to structures, such as the feed end ring 301. A seal 310 is provided to prevent and minimize hot gas and material losses from the system.

The feed chute 302 has a first section 305 and a second section 307. The first section feed chute 305 includes a housing 309 having a first end 311 and a second end 313. In this embodiment, the first end of the housing has a generally square shaped, which allows for entry of the particles into the feed chute 302. The second end 313 of the housing 309 has a generally circular shape. As shown by FIG. 8B, the diameter of housing 309 may decrease, or taper, throughout the length of the housing 309 from the generally square first end 311 to the generally circular second end 313. The second end 313 of the housing 309 is coupled to the second section 307 of the chute 302.

The second section 307 of the chute 302 has a generally tubular shape with a discharge end 312. The second section 307 of the chute 302 is positioned at an angle with respect to the position of the rotary drum 308. An intermediate segment 314 of the second section 307 penetrates the support truss 306. Referring to FIG. 8C, the intermediate segment 314 of the second section 307 has a generally elliptical cross-section, with a major axis α and a minor axis β. The major axis α of the generally elliptical second section 307 is configured to be aligned with the radial axis of the rotary drum 308, while the minor axis β of the generally elliptical second section 307 is configured to be aligned with the longitudinal axis of the rotary drum 308. The generally elliptical cross-section may be present throughout the tubular length of the second section 307 of the chute 302.

In use, material enters the housing 309 of the first section 305 of the chute 302 through the generally square shaped first end 311 and enters the second section 307 of the chute 302 through the generally circular second end 313. Material then passes through the support truss 306, passing the feed end ring 300 and discharging from the circular truss penetration 312 and entering the rotary drum 308.

The generally elliptical shape of the intermediate segment 314 of the second section 307 of the chute 302 has numerous advantages. The generally elliptical shape makes fabrication of the generally square shaped first end 311 of the housing 309 to the generally circular second end 313 of the housing transition and the penetration of the truss 306 easier because the generally elliptical shape is ellipse in such a way that the angled section required for these parts is circular in shape instead of the elliptical shape an angled section through a circular chute would create. More importantly, the generally elliptical shape minimizes critical dimensions and angles while still maintaining cross sectional area required for flow. Aligning the minor axis with the longitudinal axis of the drum provides for the least amount of total distance required to clear the end ring. This allows for a much steeper angle of penetration than that of a circular chute with the same cross sectional area, providing for the greatest possible flow from a more compact package and ensuring that the angle of repose of the granular material is never approached, greatly reducing any chances of slowed or blocked flow. In some embodiments, the feed entry device 300 may be used to feed material from a weighbelt or other solids metering apparatus into a rotary preheater. In other embodiments, the feed entry device 300 may be used to transport material from the outlet of a close coupled static preheater to the inlet of a rotary coating vessel.

One advantage of the system of this disclosure is the reduction in equipment installation costs due to the lower height and modular aspect of the equipment. The lower height configuration eliminates the cost of providing and installing chutes and/or other materials handling devices. Furthermore, the modular design reduces setup time and shipping costs because it can ship in fewer pieces. The lower height and footprint leads to a smaller, more inexpensive building requirement. The design and configuration can substantially decrease the cost of structures related to support, access, maintenance, and protection of the equipment from weather. The design and configuration can also provide for greater operator observation and access to the critical process points which includes a device and system that allows nozzle positions to be shifted without stopping the operations, as previously discussed. The design and configuration can also reduce the electrical power requirement through the reduction in material lift equipment and the combining of multiple motors into one. The design and configuration can also reduce the amount of air exhaust required to control emissions by eliminating transfer points, which also reduces the overall cost of emissions control equipment.

Another advantage of the system of the present disclosure is a heat transfer system that removes heat from the outflow airstream and condenses the water vapor from the outflow airstream. The condensed water vapor can be filtered and recirculated to the drum for cooling. The cooled outflow airstream can also be recirculated, thus affecting a closed loop coating system, thus minimizing contaminated air discharged to the environment. The configuration can also increase the amount of energy savings by reducing and/or eliminating overheat of raw materials to counteract heat losses during traditional transfer methods. This is accomplished by the close coupling and/or integration of the preheater which allows preheating of the coating apparatus with preheater air instead of heated raw materials. This preheating method effectively eliminates transfer points where energy is lost.

The modular, space saving design also lends itself towards use as a skid-mounted, portable and/or mobile production facility. Any of the aforementioned unit operations can also be easily retrofitted onto existing equipment.

EXAMPLES

Example #1 is an example use of the system in a particular example application, which should not be construed as limiting the disclosure or embodiments described.

A continuous coating of granular urea, with a nominal size range of −5+10, was performed in an apparatus which was previously described. Its dimensions were 0.6096 m×1.524 m (2 ft.×5 ft.) for the coating section, 0.6096 m×0.2286 m (2 ft.×9 in.) for the cooling section, and 0.6096 m×0.1651 m (2 ft.×6.5 in.) for the screener section. The liquid monomers used to create the coating were MDI (4,4-diphenylmethane diisocyanate), castor oil mix (96.3% castor oil, 3.7% C30+ wax) and C30+ wax. The MDI:Castor oil mass ratio used was 0.43:1. The total wax overcoat was 11% of the total coating weight. The coating apparatus was run at 6 RPM's with the urea feed rate set at 200 PPH. The coating apparatus had a 0.1016 m (4 in.) end dam ring installed which provided for a retention weight of 37.26 kg (82.15 lbs.) and a total retention time of 24.6 minutes. The urea was introduced into the coating apparatus at 71.11° C. (160° F.). Substrate temperature was maintained at 71.11° C.±1.11° C. (160±2° F.) through the entirety of the coating apparatus. Four pairs of nozzles (9 total nozzles) are placed just under the surface of the rolling bed of urea. The first three pairs of nozzles include an MDI and castor oil mix nozzle per pair. The last pair has MDI, castor oil mix, and an overcoat wax nozzle. Each nozzle pair was spaced to achieve approximately 5 minutes of retention between each for curing. Each liquid was metered in specific quantities to achieve a total product coating of 4.31%. After the final nozzle pair there was approximately 6.4 minutes of retention for curing before entering the cooler section. The cooling section was fitted with a 0.1016 m (4 in.) dam to achieve a retention time of 3.7 minutes. Approximately 140 SCFM of 37.78° C.-39.44° C. (100° F.-103° F.) air was provided to the cooler to achieve a ΔT of approximately 22.22° C. (40° F.). After the coated granules were cooled they entered the rotary screener and were then bagged. This coating test was performed for 3 hours and 20 minutes.

Dissolution data and particle size data are listed below in Table 1.

TABLE 1

| 6/17 Coated Urea PSD | | | | |
|---|---|---|---|---|
| Mesh | mm | Mass Retained | % Retained | Cumulative % Passing |
| 5 | 4 | 0.022 | 2.20 | 97.80 |
| 6 | 3.35 | 0.203 | 20.28 | 77.52 |
| 7 | 2.8 | 0.475 | 47.45 | 30.07 |
| 8 | 2.36 | 0.276 | 27.57 | 2.50 |
| 10 | 1.700 | 0.025 | 2.50 | 0.00 |
| Pan | 0 | 0 | 0.00 | 0.00 |
| | | 1.001 | | |
| | | | SGN: | 303 |
| | | | UI: | 66.22% |

Figure 9:
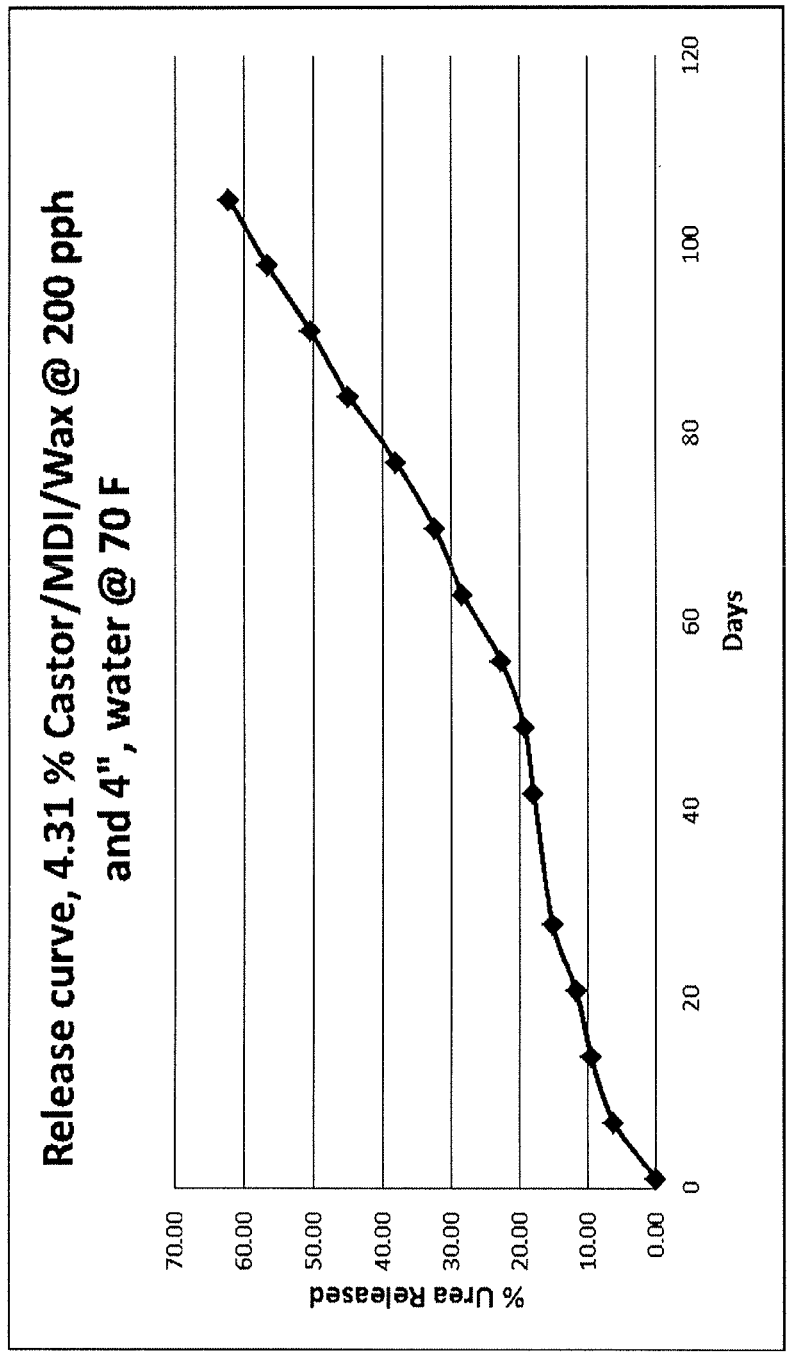
FIG. 9 illustrates an example of a release curve of the urea granules relative to the number of days according to Example 1.

FIG. 9 illustrates an example of the release curve of the urea granules relative to the number of days according to Example 1.

Example #2 is an example use of the system in a particular example application, which should not be construed as limiting the disclosure or embodiments described.

A continuous coating of granular urea, with a nominal size range of −5+10, was performed in an apparatus which was previously described. Its dimensions were 0.6096 m×1.524 m (2 ft.×5 ft.) for the coating section, 0.6096 m×0.2286 m (2 ft.×9 in.) for the cooling section, and 0.6096 m×0.1651 m (2 ft.×6.5 in.) for the screener section. The liquid monomers used to create the coating were MDI (4,4-diphenylmethane diisocyanate), castor oil mix (96.3% castor oil, 3.7% C30+ wax) and C30+ wax. The MDI:Castor oil mass ratio used was 0.43:1. The total wax overcoat was 11% of the total coating weight. The coating apparatus was run at 6 RPM's with the urea feed rate set at 300 PPH. The coating apparatus had a 0.1524 m (6 in.) end dam ring installed which provided for a retention weight of 68.27 kg (150.5 lbs.) and a total retention time of 30.1 minutes. The urea was introduced into the coating apparatus at 71.11° C. (160° F.). Substrate temperature was maintained at 71.11° C.±1.11° C. (160±2° F.) through the entirety of the coating apparatus. Four pairs of nozzles (9 total nozzles) are placed just under the surface of the rolling bed of urea. The first three pairs of nozzles include an MDI and castor oil mix nozzle per pair. The last pair has MDI, castor oil mix, and an overcoat wax nozzle. Each nozzle pair was spaced to achieve approximately 5 minutes of retention between each for curing. Each liquid was metered in specific quantities to achieve a total product coating of 4.31%. After the final nozzle pair there was approximately 11 minutes of retention for curing before entering the cooler section. The cooling section was fitted with a 0.1524 m (6 in.) dam to achieve a retention time of 4.52 minutes. Approximately 144 SCFM of 37.78° C.-40° C. (100° F.-104° F.) air was provided to the cooler to achieve a ΔT of approximately 13.89° C. (25° F.). After the coated granules were cooled they entered the rotary screener and were then bagged. This coating test was performed for 4 hours and 30 minutes.

Dissolution data and particle size data are listed below in Table 2.

TABLE 2

| 6/19 Coated Urea PSD | | | | |
|---|---|---|---|---|
| Mesh | mm | Mass Retained | % Retained | Cumulative % Passing |
| 5 | 4 | 0.004 | 0.51 | 99.49 |
| 6 | 3.35 | 0.061 | 7.76 | 91.73 |
| 7 | 2.8 | 0.290 | 36.90 | 54.83 |
| 8 | 2.36 | 0.363 | 46.18 | 8.65 |
| 10 | 1.700 | 0.064 | 8.14 | 0.51 |
| Pan | 0 | 0.004 | 0.51 | 0.00 |
| | | 0.786 | 100.00 | |
| | | | SGN: | 275 |
| | | | UI: | 67.87% |

Figure 10:
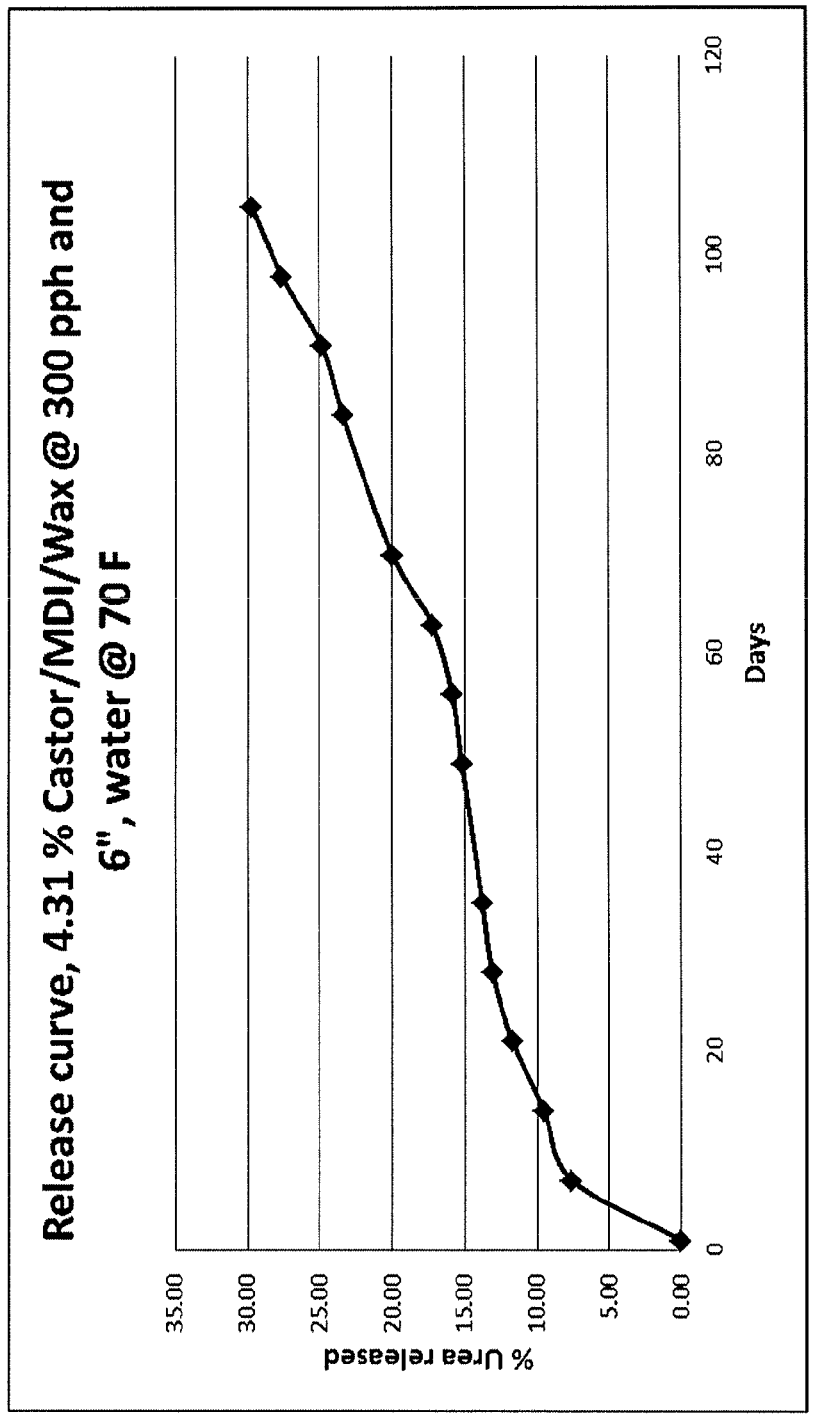
FIG. 10 illustrates an example of a release curve of the urea granules relative to the number of days according to Example 2.

FIG. 10 illustrates an example of the release curve of the urea granules relative to the number of days according to Example 2.

While various embodiments of the invention have been described, the invention is not to be restricted except in light of the attached claims and their equivalents. Drawings in the figures illustrating various embodiments are not necessarily to scale. Some drawings may have certain details magnified for emphasis, and any different numbers or proportions of parts should not be read as limiting unless so-designated in the present disclosure. Those skilled in the art will appreciate that embodiments not expressly illustrated herein may be practiced within the scope of the present invention, including those features described herein for different embodiments, which may be combined with each other and/or with currently-known or future developed technologies while remaining within the scope of the claims presented herein. Moreover, the advantages described herein are not necessarily the only advantages of the invention and it is not necessarily expected that every embodiment of the invention will achieve all of the advantages described.

The invention claimed is:

1. An apparatus for coating granular particles comprising:
   a preheater for heating the granular particles,
   a rotary drum having an inlet horizontally close coupled to the preheater to receive heated granular particles flowing from an outlet of the preheater into the inlet of the rotary drum, the inlet comprising a chute penetrating a support beam centrally located within the rotary drum,
   a coater positioned within the rotary drum to apply a coating to the heated granular particles, the coater including the support beam within the rotary drum, and
   a cooler positioned horizontally in association with the rotary drum to cool the granular particles subsequent to coating.

2. The apparatus of claim 1, wherein the preheater comprises a static fluidized bed.

3. The apparatus of claim 1, wherein the preheater comprises a mechanically assisted fluidized bed.

4. The apparatus of claim 3, wherein the mechanically assisted fluidized bed includes a perforated shell to inject heated gas.

5. The apparatus of claim 3, wherein the mechanically assisted fluidized bed includes a plurality of hollow flights which allow heated gas to be injected into the rolling bed of granular material via the hollow flights.

6. The apparatus of claim 1, wherein the preheater, the coater, and the cooler are close coupled.

7. The apparatus of claim 1, wherein the coater, and the cooler are integral.

8. The apparatus of claim 1 wherein the chute comprises a section having an elliptical cross-section.

9. The apparatus of claim 1, wherein the centrally located support beam includes injection nozzles to discharge coating components within the rotary drum.

10. The apparatus of claim 1, wherein the centrally located support beam includes spray nozzles to discharge coating components within the rotary drum.

11. The apparatus of claim 9, wherein the nozzles are adjustable from outside the apparatus for coating the granular particles.

12. The apparatus of claim 1, wherein the cooler includes a gas inlet for a flow of cooling gas to cool coated granules, and a source of liquid including a spray outlet directed toward a bed of coated granular particles, the liquid being applied to the bed at a predetermined rate for evaporation residence time of the liquid on the coated particle surface in accordance with the diffusion time into the coated particle surface.

13. An apparatus for coating granular particles comprising:
a rotary drum,
a coater positioned within the rotary drum to apply a coating to granular particles,
a cooler comprising an inlet horizontally close coupled to an outlet of the rotary drum such that granular particles flow horizontally from the outlet of the rotary drum into the inlet of the cooler, the inlet comprising an inverted feed cone forming a transfer point from the rotary drum to the cooler, the cooler being horizontally coupled to the rotary drum to receive and cool the granular particles subsequent to coating, the cooler comprising a gas inlet for a flow of cooling gas to cool coated granules and a source of liquid including a spray outlet directed toward a bed of coated granular particles, the liquid being applied to the bed at a predetermined rate for evaporation residence time of the liquid on the coated particle surface is less than the diffusion time into the coated particle surface; and
a support beam non-rotatably coupled at a feed end of the rotary drum to centrally locate the support beam along a central axis of the rotary drum, the support beam extending through the rotary drum, through the outlet of the rotary drum, and into or through the cooler, the support beam including injection nozzles to discharge coating components within the rotary drum, the nozzles adjustable from outside the apparatus for coating the granular particles.

14. The apparatus of claim 13, wherein the cooler comprises a static fluidized bed.

15. The apparatus of claim 13, wherein the cooler comprises a mechanically assisted fluidized bed.

16. The apparatus of claim 13, wherein the gas inlet is sized to allow the introduction of air at a rate of less than 0.0312 cubic meters per minute per kg of coated particles.

17. The apparatus of claim 13, wherein the spray outlet is sized to spray only between 0.001 and 0.05 kg of liquid per kg of coated particles.

18. A method of cooling granular particles subsequent to being coated with a polymer coating comprising:
heating the granular particles in a preheater;
discharging the heated granular particles from the preheater to a rotary drum via an inlet of the rotary drum horizontally close coupled to the preheater;
passing the heated granular particles into the rotary drum through a chute included in the inlet, the chute penetrating a support beam centrally located within the rotary drum;
coating granular particles at a first temperature with a coater, the coater being positioned within the rotary drum;
transferring the coated granular particles from an outlet of the rotary drum to an inlet of a cooling device horizontally close coupled to the rotary drum so that the coated granular particles flow horizontally from the outlet of the rotary drum into the inlet of the cooling device, the inlet of the cooling device comprising an inverted feed cone forming a transfer point from the rotary drum to the cooling device, the cooling device comprising a gas inlet for a flow of cooling gas to cool coated granular particles; and
cooling the coated particles until the coated particles achieve a second temperature lower than the first temperature.

19. The apparatus of claim 13, further comprising a preheater to heat granular particles wherein the rotary drum comprises an inlet horizontally close coupled to the preheater to receive the heated granular particles, the inlet comprising a chute penetrating the support beam.

20. The apparatus of claim 13, wherein the rotary drum and the cooler surround the support beam, and the rotary drum rotates with respect to the support beam.

* * * * *